United States Patent
Qiu et al.

(10) Patent No.: US 6,582,759 B1
(45) Date of Patent: Jun. 24, 2003

(54) OPTICAL ELEMENTS COMPRISING A FLUORINATED SURFACE TREATMENT COMPRISING URETHANE, ESTER OR PHOSPHATE LINKAGES

(75) Inventors: Zai-Ming Qiu, Woodbury, MN (US); Naiyong Jing, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/132,942

(22) Filed: Apr. 26, 2002

Related U.S. Application Data

(60) Provisional application No. 60/357,602, filed on Feb. 15, 2002.

(51) Int. Cl.[7] .................................................. G02B 1/10
(52) U.S. Cl. ........................... 427/163.1; 427/163.4; 428/423.1; 428/426; 428/475.2; 428/480; 428/704
(58) Field of Search ........................... 427/163.1, 163.4; 428/423.1, 426, 475.2, 480, 704

(56) References Cited

U.S. PATENT DOCUMENTS

| | | | |
|---|---|---|---|
| 2,567,011 A | 9/1951 | Diesslin et al. |
| 2,606,206 A | 8/1952 | Guenthner |
| 2,642,416 A | 6/1953 | Ahlbrecht et al. |
| 2,662,835 A | 12/1953 | Reid |
| 2,666,797 A | 1/1954 | Olson |
| 2,706,733 A | 4/1955 | Reid |
| 2,727,923 A | 12/1955 | Husted |
| 2,732,398 A | 1/1956 | Brice et al. |
| 2,759,019 A | 8/1956 | Brown et al. |
| 2,764,602 A | 9/1956 | Ahlbrecht |
| 2,803,615 A | 8/1957 | Ahlbrecht |
| 2,803,656 A | 8/1957 | Ahlbrecht |
| 2,809,990 A | 10/1957 | Brown |
| 2,841,573 A | 7/1958 | Ahlbrecht |
| 2,934,450 A | 4/1960 | Brown |
| 3,094,547 A | 6/1963 | Heine |
| 3,222,204 A | 12/1965 | Weber et al. |
| 3,666,530 A | 5/1972 | Aue et al. |
| 3,922,381 A | 11/1975 | Datta |
| 4,713,295 A | 12/1987 | Laroche |
| 6,153,671 A | 11/2000 | Schleifstein |

FOREIGN PATENT DOCUMENTS

| | | |
|---|---|---|
| EP | 0 433 070 | 6/1991 |
| WO | WO 99/37720 | 7/1999 |
| WO | WO 01/30873 | 5/2001 |

OTHER PUBLICATIONS

Product Information: "Krytox®157 FS Fluorinated Oil," Du Pont, Sep. 29, 2000.

Primary Examiner—James J. Seidleck
Assistant Examiner—Travis B. Ribar
(74) Attorney, Agent, or Firm—Carolyn A. Fischer

(57) ABSTRACT

The present invention relates to optical elements comprising fluorochemical surface treatments. The invention further relates to materials such as retroreflective sheetings, pavement markings and beaded projection screens comprising a binder and the surface treated optical elements.

16 Claims, No Drawings

OPTICAL ELEMENTS COMPRISING A FLUORINATED SURFACE TREATMENT COMPRISING URETHANE, ESTER OR PHOSPHATE LINKAGES

RELATED APPLICATIONS

This application claims priority to U.S. patent application Ser. No. 60/357,602 filed Feb. 15, 2002.

FIELD OF THE INVENTION

The present invention relates to optical elements comprising fluorochemical surface treatments. The invention further relates to materials such as retroreflective sheetings, pavement markings and beaded projection screens comprising a binder and the surface treated optical elements. The fluorochemical surface treatment comprises at least two linkages selected from urethane linkages, ester linkages or phosphate linkages; and at least one perfluorinated group.

BACKGROUND OF THE INVENTION

Beaded projection display screens, retroreflective sheeting used in the manufacture of roadway signs, and retroreflective paints typically include optical elements adhered through the use of a binder. In the case of beaded projection display materials, the optical elements are microscopic glass beads that act as lenses to collect projected light from the rear of the screen and focus it to relatively small spots, near the surfaces of the microspheres. The foci are approximately in the areas where the optical elements contact a front support layer. In other retroreflective materials, the optical elements act as lenses which focus the light onto a reflector (metal mirror of diffusely reflecting pigment) and once the light has been reflected off the reflector the microspheres again act as lenses to resend the light back toward the incoming light source. In order to contribute the desired retroreflective property, however, it is important that a layer of glass microspheres be present on the surface of the binder layer.

As discussed in U.S. Pat. No. 3,222,204, ordinary glass beads tend to sink into the uncured liquid binder layer. In instances wherein the individual beads are not entirely submerged, the optical properties of the bead can also be impaired by the binder wetting out the bead surface and spreading on the exposed bead surface. To address this problem, U.S. Pat. No. 3,222,204 teaches coating the glass beads with a thin surface coating of an oleophobic fluorocarbon-sizing agent. At column 5, lines 61–75, this reference states that, "Aqueous treating solutions of fluorocarbon chromium coordination complexes are preferred and are described in U.S. Pat. No. 2,662,835 (Dec. 15, 1953) and U.S. Pat. No. 2,809,990 (Oct. 15, 1957) and U.S. Pat. No. 2,934,450 (Apr. 26, 1960). The complex may be made by reacting chromyl chloride with a fluorocarbon monocarboxylic acid (having a highly fluorinated terminal chain or tail containing 4 to 10 carbon atoms) in an isopropanol vehicle that serves as both a solvent and reducing agent, the chromium to acid mole ratio being in the range of 2:1 to 5:1. The resultant green-colored isopropanol solution of the complex is diluted with water at the time of use. The fluorocarbon acid preferably has 6 to 8 fully fluorinated (perfluorinated) carbon atoms in the terminal fluorocarbon chain or tail." Specific working examples include chromium coordination complexes of perfluorooctanoic acid and N-ethyl-N-perfluorooctanesulfonyl glycine.

U.S. Pat. No. 4,713,295 teaches coating glass beads with a mixture of substances. The mixture comprises a first substance which if used alone would tend to make the beads hydrophobic while leaving them oleophilic and a second substance which if used alone would tend to make the beads both hydrophobic and oleophobic. "For the best results, it is preferred to use a second substance which is an anionic fluorocarbon compound, and optimally, said second substance is a fluoro-alkyl-sulphonate, for example a fluoro-alkyl-sulphonate in which the alkyl has a long chain (C14 to C18)." (See Column 4, lines 8–13). The exemplified hydrophobic and oleophobic substance is a potassium fluoroalkyl-sulphonate (for example FC129 from 3M). (See column 5, lines 50–52) FC129 is a potassium fluoroctyl sulphonyl-containing compound.

SUMMARY OF THE INVENTION

The present invention relates to fluorochemicals suitable for use as a surface treatment to induce float of optical elements. The fluorochemicals comprise the reaction product of at least one hydroxyl group containing material and a coreactant including polyisocyanates, polycarboxylic acids and derivatives thereof, or (poly)phosphoric acid derivatives. At least one reactant or coreactant comprises a fluorinated group. Preferably, at least one reactant or coreactant comprises a water-solubilizing group or silane group. Preferred fluorinated groups include perfluoroalkyl and perfluoroheteroalkyl, preferably having 2 to 6 and more preferably no more than 4 carbon atoms. The hydroxyl group containing material may be a fluorinated monoalcohol, fluorinated polyol or mixture thereof. Alternatively a non-fluorinated polyol may be employed as the hydroxyl containing material, preferably in combination with a fluorinated monoalcohol. The hydroxyl group containing material and/or the coreactant may be substituted with a water-solubilizing group and/or a silane group. Further, the reaction product may further comprise a long chain hydrocarbon monoalcohol, a monofunctional fluorochemical, a water-solubilizing group containing ingredient, a silane group containing ingredient or mixture thereof.

The invention further relates to optical elements comprising a fluorochemical surface treatment wherein the fluorochemical comprises at least two linkages selected from urethane linkages, ester linkages or phosphate linkages; and at least one perfluorinated group with the provision that wherein the linkages are urethane the fluorochemical surface treatment is free of oxygen in the backbone.

In another embodiment, the invention relates to a method of coating optical elements comprising the steps of providing a surface treatment composition comprising a solvent and the previously described fluorochemical surface treatment, coating optical elements with the composition; and drying the composition. The solvent is preferably water, optionally comprising from 0 to about 30 wt-% of a cosolvent.

In other embodiments, the invention relates to a pavement marking, a reflective sheeting, and a rear projection screen comprising a binder and a multitude of the surface treated optical elements. The optical elements are embedded in the binder at a depth of about 40–70% of their diameters.

DETAILED DESCRIPTION OF THE INVENTION

The present invention relates to optical elements such as glass beads coated with a fluorochemical surface treatment. The terminology "optical element" refers to a material having a particle size ranging from about 25 to 1000 microns and having a refractive index ranging from about 1.5 to about 2.3 and higher.

The optical elements have at least one dimension that is no larger than 2 millimeters and preferably no larger than 250 microns. The optical elements may be in the form of any shape such as granules, flakes and fibers. However, spheroidal glass elements, denoted as "glass beads", "beads" and "microspheres" hereinafter are preferred for materials such as retroreflective articles (e.g. retroreflective sheetings, pavement markings and beaded projection screens).

During the manufacture of retroreflective materials, optical elements are fixed in place by means of a liquid binder. Optical elements have a density or specific gravity several times that of the liquid binder, causing the optical elements to sink into the liquid binder layer, rather than float on the surface.

Preferred properties of optical elements will be described herein with respect to glass beads. Ordinary glass beads typically have a density of about 2.5 and a refractive index of about 1.5. "High index" beads refers to beads having a density of about 3.5 and a refractive index of about 1.9, whereas "super high index" typically refers to beads having a density of about 5 and a refractive index of about 2.3 or higher. The diameter of the glass beads typically ranges from a few microns to approximately 2500 microns and is preferably from about 25 to 1000 microns.

In addition to having the desired particle size and refractive index, the glass beads are typically transparent. The term transparent means that when viewed under an optical microscope (e.g., at 100×) the microspheres have the property of transmitting rays of visible light so that bodies beneath the microspheres, such as bodies of the same nature as the microspheres can be clearly seen through the microspheres, when both are immersed in oil of approximately the same refractive index as the microspheres. The outline, periphery or edges of bodies beneath the microspheres are clearly discernible. Although the oil should have a refractive index approximating that of the microspheres, it should not be so close that the microspheres seem to disappear as would be the case for a perfect match.

The optical elements may comprise microspheres that are ceramic. In general, ceramic microsphere optical elements are comprised of metal oxides that are substantially colorless. Suitable metal oxides include $Al_2O_3$, $SiO_2$, $ThO_2$, $SnO_2$, $TiO_2$, $Y_2O_3$ and $ZrO_2$ with the oxides of zirconium, silicon, and titanium being preferred. The ceramic microspheres can exhibit a range of properties, depending on the kind and amounts of the various metal oxides employed as well as the method of manufacture. Preferred, however, are dense microspheres having substantially no open porosity that have an average hardness greater than sand.

Additional information concerning the desired properties for various end-uses and methods of manufacture of microspheres (e.g. sol-gel process), can be found in U.S. Pat. Nos. 3,493,403; 3,709,706; and 4,564,556; incorporated herein by reference. Glass beads suitable for use as optical elements in the invention are also commercially available from Flex-O-Lite Corporation, Fenton, Mo. and Nippon Electric Glass, Osaka, Japan.

The optical elements of the invention are coated with a surface treatment that alters the floatation properties of the optical element in the liquid binder. "Float" and derivations thereof, described in the context of glass beads, refers to the beads assuming a position wherein slightly more than half of each bead is submerged. The liquid binder preferably contacts the embedded beads only up to 5 to 30° above their equators. The floatability of the glass beads can be affected to some extent by the particle size, particle size distribution, surface chemistry and chemical make-up of the particular glass beads as well as the chemical make-up, density, and viscosity of the binder. In general, however, only about 10% or less of the glass beads tend to float in heptane test liquid in the absence of an effective surface treatment.

The position that the glass beads attain relative to the undisturbed binder due to the surface treatment assists the anchoring of the beads in the ultimate dried or solidified binder coating. The glass beads are preferably embedded to about 40–70%, and more preferably to about 40–60% of their diameters. The beads are adequately exposed providing a sphere-lens having a large optical aperture relative to its size. During the drying or solidification of the binder, there is some shrinkage of the binder film. However, the beads remain bonded with the centers of the floated beads being approximately equidistant from the underlying back surface of the binder layer or the top surface of the base.

In addition to the improvement in floatation of the optical elements, it is also important that the surface treatment does not adversely affect the adhesion of the optical elements with the liquid binder. The adhesion can be evaluated in several ways and will be described herein with respect to a preferred optical element, glass beads. The initial adhesion can be subjectively determined by estimating the depth to which the embedded glass beads have sunk into the binder after curing. The glass beads are preferably embedded to a depth of about 40–70%, and more preferably to about 40–60% of their diameters. Another way of evaluating adhesion is accelerated aging evaluations. A piece of cured glass bead-embedded binder is conditioned in boiling water for 24 hours. After conditioning, the glass beads are preferably embedded to the same extent as prior to conditioning and the individual glass beads are difficult to remove with a dissection probe. Yet another way to evaluate the effect of the binder on adhesion is comparative tensile testing. A uniform slurry of binder and untreated glass beads at a ratio of about 1 to 3 is drawn down into a film having a thickness of about 0.4 mm. A second slurry of binder and surface treated glass beads employing the same ratio of ingredients and film thickness is prepared. After the samples are fully cured, the samples are conditioned for 24 hours in water at ambient temperature. Tensile testing is conducted with a 1" (2.5 cm) wide sample employing a 2" (5 cm) gap at a rate of 0.5 inches (1.3 cm)/minute. The stress at break of the sample comprising the surface treated beads is about the same as or preferably greater than the control sample, comprising untreated beads ($\geq$about 90% of the standard deviation of the average value). Any one of the previously described methods is typically sufficient to determine whether the surface treatment adversely affects the adhesion of the glass beads with the liquid binder. Preferably, however, all three of the evaluations are conducted.

The optical elements are coated with a fluorochemical surface treatment. As used herein "surface treatment" refers to a composition that causes at least about 90% of the optical elements to float in heptane or an aromatic solvent, such as toluene.

The following definition of terms is used in the specification and claims with regard to the description of the fluorochemical surface treatments, unless otherwise stated:

"Acyloxy" means a radical—OC(O)R where R is, alkyl, alkenyl, and cycloalkyl, e.g., acetoxy, 3,3,3-trifluoroacetoxy, propionyloxy, and the like.

"Alkoxy" means a radical—OR where R is an alkyl group as defined below, e.g., methoxy, ethoxy, propoxy, butoxy, and the like.

"Alkyl" means a linear saturated monovalent hydrocarbon radical having from one to about twelve carbon atoms or a branched saturated monovalent hydrocarbon radical having from three to about twelve carbon atoms, e.g., methyl, ethyl, 1-propyl, 2-propyl, pentyl, and the like.

"Alkylene" means a linear saturated divalent hydrocarbon radical having from one to about twelve carbon atoms or a branched saturated divalent hydrocarbon radical having from three to about twelve carbon atoms, e.g., methylene, ethylene, propylene, 2-methylpropylene, pentylene, hexylene, and the like.

"Aralkylene" means an alkylene radical defined above with an aromatic group attached to the alkylene radical, e.g., benzyl, pyridylmethyl, 1-naphthylethyl, and the like. "Fluorocarbon monoalcohol" and "fluorinated monalcohol" mean a compound having one hydroxyl group and a perfluoroalkyl or a perfluoroheteralkyl group, e.g. $C_4F_9SO_2N(CH_3)CH_2CH_2OH$, $C_4F_9CH_2CH_2OH$, $C_2F_5O(C_2F_4O_3CF_2CONHC_2H_4OH$, c—$C_6F_{11}CH_2OH$, and the like.

"Heteroacyloxy" has essentially the meaning given above for acyloxy except that one or more heteroatoms (i.e. oxygen, sulfur, and/or nitrogen) may be present in the R group and the total number of carbon atoms present may be up to 50, e.g., $CH_3CH_2OCH_2CH_2C(O)O—$, $C_4H_9OCH_2CH_2OCH_2CH_2C(O)O—$, $CH_3O(CH_2CH_2O)_nCH_2CH_2C(O)O—$, and the like.

"Heteroalkoxy" has essentially the meaning given above for alkoxy except that one or more heteroatoms (i.e. oxygen, sulfur, and/or nitrogen) may be present in the alkyl chain and the total number of carbon atoms present may be up to 50, e.g. $CH_3CH_2OCH_2CH_2O—$, $C_4H_9OCH_2CH_2OCH_2CH_2O—$, $CH_3O(CH_2CH_2O)_nH$, and the like.

"Heteroalkyl" has essentially the meaning given above for alkyl except that one or more heteroatoms (i.e. oxygen, sulfur, and/or nitrogen) may be present in the alkyl chain, these heteroatoms being separated from each other by at least one carbon, e.g., $CH_3CH_2OCH_2CH_2—$, $CH_3CH_2OCH_2CH_2OCH(CH_3)CH_2—$, $C_4F_9CH_2CH_2SCH_2CH_2—$, and the like.

"Heteroaralkylene" means an aralkylene radical defined above except that catenated oxygen, sulfur, and/or nitrogen atoms may be present, e.g., phenyleneoxymethyl, phenyleneoxyethyl, benzyleneoxymethyl, and the like.

"Halo" means fluoro, chloro, bromo, or iodo, preferably fluoro and chloro.

"Long-chain hydrocarbon monoalcohol" means a compound having one hydroxyl group and a long chain hydrocarbon group having 10 to 18 carbons which may be saturated, unsaturated, or aromatic, and may optionally be substituted with one or more chlorine, bromine, trifluoromethyl, or phenyl groups, e.g. $CH_3(CH_2)_{10}CH_2OH$, $CH_3(CH_2)_{14}CH_2OH$, and the like.

"Oligomer" means a polymer molecule consisting of only a few (for example, from 2 to about 20) repeat (polymerized) units.

"Perfluoroalkyl" has essentially the meaning given above for "alkyl" except that all or essentially all of the hydrogen atoms of the alkyl radical are replaced by fluorine atoms and the number of carbon atoms is from 3 to about 8, e.g. perfluoropropyl, perfluorobutyl, perfluorooctyl, and the like.

"Perfluoroalkylene" has essentially the meaning given above for "alkylene" except that all or essentially all of the hydrogen atoms of the alkylene radical are replaced by fluorine atoms, e.g., perfluoropropylene, perfluorobutylene, perfluorooctylene, and the like "Perfluoroheteroalkyl" has essentially the meaning given above for "heteroalkyl" except that all or essentially all of the hydrogen atoms of the heteroalkyl radical are replaced by fluorine atoms and the number of carbon atoms is from 3 to about 100, e.g. $CF_3CF_2OCF_2CF_2—$, $CF_3CF_2O(CF_2CF_2O)_3CF_2CF_2—$, $C_3F_7O(CF(CF_3)CF_2O)_mCF(CF_3)CF_2—$ where m is from about 10 to about 30, and the like.

"Perfluorinated group" means an organic group wherein all or essentially all of the carbon bonded hydrogen atoms are replaced with fluorine atoms, e.g. perfluoroalkyl, perfluoroheteroalkyl, and the like.

"Polyfunctional isocyanate compound" means a compound containing two or more isocyanate radicals, —NCO, attached to a multivalent organic group, e.g. hexamethylene diisocyanate, the biuret and iscyanurate of hexamethylene diisocyanate, and the like.

"Polyol" means an organic compound or polymer with an average of at least about 2 primary or secondary hydroxyl groups per molecule, e.g. ethylene glycol, propylene glycol, 1,6-hexanediol, and the like.

"Silane group" means a group comprising silicon to which at least one hydrolyzable group is bonded, e.g. $—Si(OCH_3)_3$, $—Si(OOCCH_3)_2CH_3$, $—Si(Cl)_3$, and the like.

The surface treatment generally comprises at least one fluorochemical, wherein the fluorochemical comprises at least two linkages selected from urethane linkages or ester linkages or phosphate linkages. The fluorochemical comprises at least one pendant and/or terminal fluorinated (e.g. perfluorinated) group. For embodiments wherein the linkages are urethane linkages, the fluorochemical is free of oxygen in the backbone. Such surface treatments generally comprise the reaction product of at least one hydroxyl group containing material with at least one coreactant selected from polyfunctional isocyanate(s) or polycarboxylic acid(s) and derivatives thereof or (poly)phosphoric acid derivatives; and optionally at least one second coreactant The terminology "(poly)phosphoric acid derivative" refers to derivatives of phosphoric acid (e.g. salt) as well as derivatives having one or more of such groups (e.g. polyphosphates). At least one reactant or coreactant is fluorinated. The surface treatment generally comprises at least one water-solubilizing group or at least one silane groups. Such groups may independently be pendant from the repeating unit or terminal. Such groups aid in forming aqueous solutions, dispersions or emulsion from such fluorochemicals. Further, such groups improve the adhesion of the surface treatment to the optical element (e.g. glass or glass/ceramic beads) surface. In some embodiment the water-solubilizing group is present in view of the selection of coreactant. (e.g. (poly)phosphoric acid derivative). In other embodiments the water-solubilizing group is present by employing a hydroxyl containing material and/or coreactant that has been substituted with one or more of such water-solubilizing groups. Alternatively or in addition thereto, a second coreactant may be employed that comprises such water-solubilizing group(s).

The general structure of preferredsurface treatments may be represented by the following formula:

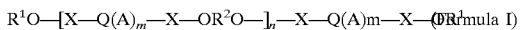

$R^1$ is selected from $R_fZR^3$, H, $(Y)_3SiR^3$, $MOC(O)R^3$, long chain alkyl group or combination thereof wherein;
$R_fZR^3—$ is a residue of at least one of the fluorochemical monoalcohols;

$R_f$ is a perfluoroalkyl group having 3 to about 12 carbon atoms, or a perfluoroheteroalkyl group having 3 to about 50 carbon atoms;

Z is a covalent bond, sulfonamido ($-SO_2NR^4-$), or carboxamido ($-CONR^4-$) linkage, where $R^4$ is hydrogen or alkyl;

$R^3$ is a divalent straight or branched chain alkylene, cycloalkylene, or heteroalkylene group of 1 to 14 carbon atoms;

M is R'O, H, NH4, Na, K, R'O or combination;

each Y is independently a hydroxy; a hydrolyzable moiety selected from the group consisting of alkoxy, acyloxy, heteroalkoxy, heteroacyloxy, halo, and oxime; or a non-hydrolyzable moiety selected from the group consisting of phenyl, alicyclic, straight-chain aliphatic, and branched-chain aliphatic, wherein at least one Y is a hydrolyzable moiety.

X is $-C(O)NH-$, $-C(O)-$, or $P(O)(OM)-$

Q is a multi-valent organic group which is a residue of the polyfunctional isocyanate, carboxyl or phosphonyl compound;

$R^2$ is a divalent organic group which is a residue of the polyol and may be substituted with or contain (i) water-solubilizing groups selected from the group consisting of carboxylate, sulfate, sulfonate, phosphonate, polyethylene oxide, ammonium, quaternary ammonium, and mixtures thereof and (ii) perfluorinated groups;

A is R'—O or $R^1$—O—X;

m is an integer from 0 to 2; and n is an integer from 0 to 20.

Preferred surface treatments are substantially free of perfluoroalkyl side chains and end groups having more than 6, and more preferably substantially free of perfluoroalkyl side chains and end groups having more than 4 carbon atoms. "Substantially free" refers to the presence of less than about 1 wt-% of such fluoroalkyl segments as can be detected by means of x-ray photoelectron spectroscopy (XPS) or time of flight secondary ion mass spectrometry.

The hydroxyl group containing material typically comprises a fluorinated polyol, a fluorinated monoalcohol, or mixture thereof. Alternatively, however, a non-fluorinated monoalcohol or non-fluorinated polyol may be employed as the hydroxyl group containing material with the proviso that a fluorinated coreactant is provided.

Organic polyols for use in the invention have an average hydroxyl functionality of at least about 2 (preferably, about 2 to 5; more preferably, about 2 to 3; most preferably, about 2, as diols are most preferred). The hydroxyl groups can be primary or secondary, with primary hydroxyl groups being preferred for their greater reactivity. Mixtures of diols with polyols that have an average hydroxyl functionality of about 2.5 to 5 (preferably about 3 to 4; more preferably, about 3) can also be used. Such mixtures may contain no more than about 20 percent by weight of such polyols, no more than about 10 percent, and no more than about 5 percent.

Suitable polyols include those that comprise at least one aliphatic, heteroaliphatic, alicyclic, heteroalicyclic, aromatic, heteroaromatic, or polymeric moiety. Preferred polyols are aliphatic or polymeric polyols that contain hydroxyl groups as terminal groups or as groups that are pendant from the backbone chain of the polyol.

The molecular weight (that is, the number average molecular weight) of hydrocarbon polyols can generally vary from about 60 to about 2000, preferably, from about 60 to about 1000, more preferably, from about 60 to about 500, most preferably, from about 60 to about 300. The equivalent weight (that is, the number average equivalent weight) of hydrocarbon polyols generally can be in the range of about 30 to about 1000, preferably, from about 30 to about 500, more preferably, from about 30 to about 250. If the polyol comprises a perfluoropolyether, it can have a molecular weight as high as approximately 7000.

The polyols or fluorinated alcohols can be substituted with or contain other groups. Thus, the hydroxyl group containing material may be a branched or straight chain hydrocarbon, an alcohol or polyol containing at least one solubilizing group, a fluorinated alcohol or polyol comprising a monovalent or divalent perfluorinated group, an alcohol or polyol comprising a silane group, a polyalkylsiloxane alcohol or polyol (e.g. $-(Si(Ar)_2O)-$, e.g. HOR[Si(C_6H_5)_2 O]SiROH, wherein each R is independently straight or branched chain alkyl; $-(Si(R)_2O)-$, e.g. HOR[Si(CH_3)_2 O]_nSiROH, wherein each R is independently straight or branched chain alkyl. Solubilizing groups include carboxylate, sulfate, sulfonate, phosphate, phosphonate, ammonium, quaternary ammonium, and the like.

The perfluorinated groups may be perfluoroalkyl and perfluoroheteroalkyl. Perfluoroalkyl groups are preferred, with perfluoroalkyl groups having from 2 to 6 carbon atoms being more preferred and perfluoroalkyl groups having 4 carbon atoms being most preferred.

The silane groups of the hydroxyl group containing material may contain one, two, or three hydrolyzable groups on the silicon atom. Polyalkylsiloxane hydroxyl group containing materials include, but are not limited to, hydroxyalkyl terminated polydimethyl siloxanes, polymethyloctadecylsiloxane, polydimethylmethyloctadecylsiloxane, polydimethyldodecyltetradecylsiloxane, polymethylhexadecylsiloxane, polymethyloctylsiloxane, polymethyl-3,3,3-trifluoropropylsiloxane, and the like. Polyarylsiloxane diols are essentially the same as the polyalkylsiloxanes with some or all of the methyl groups replaced with phenyl groups, such as hydroxyalkyl terminated polydiphenylsiloxane and hydroxyalkyl terminated dimethyl-diphenylsiloxane copolymer.

Representative examples of suitable non-polymeric polyols that may be employed in combination with a fluorinated ingredient (e.g. fluorinated polyol, fluorinated alchohol) include alkylene glycols, polyhydroxyalkanes, and other polyhydroxy compounds. The alkylene glycols include, for example, 1,2-ethanediol; 1,2-propanediol; 3-chloro-1,2-propanediol; 1,3-propanediol; 1,3-butanediol; 1,4-butanediol; 2-methyl-1,3-propanediol; 2,2-dimethyl-1,3-propanediol (neopentylglycol); 2-ethyl-1,3-propanediol; 2,2-diethyl-1,3-propanediol; 1,5-pentanediol; 2-ethyl-1,3-pentanediol; 2,2,4-trimethyl-1,3-pentanediol; 3-methyl-1,5-pentanediol; 1,2-, 1,5-, and 1,6-hexanediol; 2-ethyl-1,6-hexanediol; bis(hydroxymethyl)cyclohexane; 1,8-octanediol; bicyclo-octanediol; 1,10-decanediol; tricyclodecanediol; norbornanediol; and 1,18-dihydroxyoctadecane.

The polyhydroxyalkanes include, for example, glycerine; trimethylolethane; trimethylolpropane; 2-ethyl-2-(hydroxymethyl)-1,3-propanediol; 1,2,6-hexanetriol; pentaerythritol; quinitol; mannitol; and sorbitol.

Other polyhydroxy compounds include, for example, such as 2,2-bis(hydroxymethyl)propionic acid; di(ethylene glycol); tri(ethylene glycol); tetra(ethylene glycol); tetramethylene glycol; dipropylene glycol; diisopropylene glycol; tripropylene glycol; bis(hydroxymethyl)propionic acid; N,N-bis(2-hydroxyethyl)-3-aminopropyltriethoxysilane; bicine; N-bis(2-hydroxyethyl)perfluorobutylsulfonamide; 1,11-(3,6-dioxaundecane)diol; 1,14-(3,6,9,12- tetraoxatetradecane)diol; 1,8-(3,6-dioxa-2,5,8-trimethyloctane)diol; 1,14-(5,10-dioxatetradecane)diol; castor oil; 2-butyne-1,4-diol; N,N-bis(hydroxyethyl)benzamide; 4,4'-bis(hydroxymethyl)diphenylsulfone; 1,4-benzenedimethanol; 1,3-bis(2-hydroxyethoxy)benzene; 1,2-dihydroxybenzene; resorcinol; 1,4-dihydroxybenzene; 3,5-, 2,6-, 2,5-, and 2,4-dihydroxybenzoic acid; 1,6-, 2,6-, 2,5-, and 2,7-dihydroxynaphthalene; 2,2'- and 4,4'-biphenol; 1,8-dihydroxybiphenyl; 2,4-dihydroxy-6-methyl-pyrimidine; 4,6-dihydroxypyrimidine; 3,6-dihydroxy-pyridazine; bisphenol A; 4,4'-ethylidenebisphenol; 4,4'-isopropylidenebis(2,6-dimethylphenol); bis(4-hydroxyphenyl)methane; 1,1-bis(4-hydroxyphenyl)-1-phenylethane (bisphenol C); 1,4-bis(2-hydroxyethyl)piperazine; bis(4-hydroxyphenyl) ether; as well as other aliphatic, heteroaliphatic, saturated alicyclic, aromatic, saturated heteroalicyclic, and heteroaromatic polyols; and the like, and mixtures thereof.

Representative examples of useful polymeric polyols include polyoxyethylene, polyoxypropylene, and ethylene oxide-terminated polypropylene glycols and triols of molecular weights from about 200 to about 2000, corresponding to equivalent weights of about 100 to about 1000 for the diols or about 70 to about 700 for triols; polytetramethylene glycols of varying molecular weight; polydialkylsiloxane diols of varying molecular weight; hydroxy-terminated polyesters and hydroxy-terminated polylactones (e.g., polycaprolactone polyols); hydroxy-terminated polyalkadienes (e.g., hydroxy-terminated polybutadienes); and the like. Mixtures of polymeric polyols can be used if desired.

Useful commercially available polymeric polyols include Carbowax™ poly(ethylene glycol) materials in the number average molecular weight ($M_n$) range of from about 200 to about 2000 (available from Union Carbide Corp.); poly(propylene glycol) materials such as PPG-425 (available from Lyondell Chemicals); block copolymers of poly(ethylene glycol) and poly(propylene glycol) such as Pluronic™ L31 (available from BASF Corporation); fluorinated oxetane polyols made by the ring-opening polymerization of fluorinated oxetane such as Poly-3-Fox™ (available from Omnova Solutions, Inc., Akron Ohio); polyetheralcohols prepared by ring opening addition polymerization of a fluorinated organic group substituted epoxide with a compound containing at least two hydroxyl groups as described in U.S. Pat. No. 4,508,916 (Newell et al); Bisphenol A ethoxylate, Bisphenol A propyloxylate, and Bisphenol A propoxylate/ethoxylate (available from Sigma-Aldrich); polytetramethylene ether glycols such as Polymeg™ 650 and 1000 (available from Quaker Oats Company) and the Terathane™ polyols (available from DuPont); hydroxy-terminated polybutadiene resins such as the Poly bd™ materials (available from Elf Atochem); the "PeP" series (available from Wyandotte Chemicals Corporation) of polyoxyalkylene tetrols having secondary hydroxyl groups, for example, "PeP" 450, 550, and 650; polycaprolactone polyols with M, in the range of about 200 to about 2000 such as Tone™ 0201, 0210, 0301, and 0310 (available from Union Carbide); "Paraplex™ U-148" (available from Rohm and Haas), an aliphatic polyester diol; polyester polyols such as the Multron™ poly(ethyleneadipate)polyols (available from Mobay Chemical Co.); polycarbonate diols such as Duracarb™ 120, a hexanediol carbonate with $M_n$=900 (available from PPG Industries Inc.); and the like; and mixtures thereof.

Alternatively or in addition thereto, the hydroxyl group containing material may comprise a fluorinated monoalcohol. The fluorinated monoalcohol can contain straight chain, branched chain, or cyclic fluorinated alkylene groups or any combination thereof. The fluorinated monoalcohol can optionally contain one or more heteroatoms (i.e. oxygen, sulfur, and/or nitrogen) in the carbon-carbon chain so as to form a carbon-heteroatom-carbon chain (i.e. a heteroalkylene group). Fully-fluorinated groups are generally preferred, but hydrogen or chlorine atoms can also be present as substituents, provided that no more than one atom of either is present for every two carbon atoms. The terminal portion of the group is generally fully-fluorinated, preferably containing at least three fluorine atoms, e.g., $CF_3O—$, $CF_3CF_2—$, $CF_3CF_2CF_2—$, $(CF_3)_2N—$, $(CF_3)_2CF—$, $SF_5CF_2—$. Perfluorinated aliphatic groups (i.e., those of the formula $C_nF_{2n+1}—$) wherein n is 2 to 6 inclusive are the preferred $R_f$ groups, with n=3 to 5 being more preferred and with n=4 being the most preferred. Preferred fluorine-containing monoalcohols include alcohol terminated hexafluoropropylene oxide derivatives. If desired, similar thiols rather than alcohols, can be utilized as well.

Polyfunctional isocyanate compounds useful in the preparation of the fluorinated polyurethane surface treatments comprise isocyanate radicals attached to the multivalent organic group, Q, which can comprise a multivalent aliphatic, alicyclic, or aromatic moiety; or a multivalent aliphatic, alicyclic or aromatic moiety attached to a biuret, an isocyanurate, or a uretdione, or mixtures thereof. Preferred polyfunctional isocyanate compounds contain two or three —NCO radicals. Compounds containing two —NCO radicals are comprised of divalent aliphatic, alicyclic, araliphatic, or aromatic moieties to which the —NCO radicals are attached. Preferred compounds containing three —NCO radicals are comprised of isocyanatoaliphatic, isocyanatoalicyclic, or isocyanatoaromatic, monovalent moieties, which are attached to a biuret or an isocyanurate. Such isocyanates may be fluorinated.

Representative examples of suitable polyfunctional isocyanate compounds include isocyanate functional derivatives of the polyfunctional isocyanate compounds as defined herein. Examples of derivatives include, but are not limited to, those selected from the group consisting of ureas, biurets, allophanates, dimers and trimers (such as uretdiones and isocyanurates) of isocyanate compounds, and mixtures thereof. Any suitable organic polyisocyanate, such as an aliphatic, alicyclic, araliphatic, or aromatic polyisocyanate, may be used either singly or in mixtures of two or more. The aliphatic polyfunctional isocyanate compounds generally provide better light stability than the aromatic compounds. Aromatic polyfunctional isocyanate compounds, on the other hand, are generally more economical and reactive toward polyols and other poly(active hydrogen) compounds than are aliphatic polyfunctional isocyanate compounds. Suitable aromatic polyfunctional isocyanate compounds include, but are not limited to, those selected from the group consisting of 2,4-toluene diisocyanate (TDI), 2,6-toluene diisocyanate, an adduct of TDI with trimethylolpropane (available as Desmodur™ CB from Bayer Corporation, Pittsburgh, Pa.), the isocyanurate trimer of TDI (available as Desmodur™ IL from Bayer Corporation, Pittsburgh, Pa.), diphenylmethane 4,4'-diisocyanate (MDI), diphenylmethane 2,4'-diisocyanate, 1,5-diisocyanato-naphthalene, 1,4-phenylene diisocyanate, 1,3-phenylene diisocyanate, 1-methyoxy-2,4-phenylene diisocyanate, 1-chlorophenyl-2,4-diisocyanate, and mixtures thereof.

Examples of useful alicyclic polyfunctional isocyanate compounds include, but are not limited to, those selected from the group consisting of dicyclohexylmethane diisocyanate ($H_{12}$MDI, commercially available as Desmodur™ W, available from Bayer Corporation, Pittsburgh, Pa.), 4,4'-isopropyl-bis(cyclohexylisocyanate), isophorone diisocyanate (IPDI), cyclobutane-1,3-diisocyanate, cyclohexane 1,3-diisocyanate, cyclohexane 1,4-diisocyanate (CHDI), 1,4-cyclohexanebis(methylene isocyanate) (BDI), 1,3-bis(isocyanatomethyl)cyclohexane ($H_6$XDI), 3-isocyanatomethyl-3,5,5-trimethylcyclohexyl isocyanate, and mixtures thereof.

Examples of useful aliphatic polyfunctional isocyanate compounds include, but are not limited to, those selected from the group consisting of 1,4-tetramethylene diisocyanate, hexamethylene 1,4-diisocyanate, hexamethylene 1,6-diisocyanate (HDI), 1,12-dodecane diisocyanate, 2,2,4-trimethyl-hexamethylene diisocyanate (TMDI), 2,4,4-trimethyl-hexamethylene diisocyanate (TMDI), 2-methyl-1,5-pentamethylene diisocyanate, dimer diisocyanate, the urea of hexamethylene diisocyanate, the biuret of hexamethylene 1,6-diisocyanate (HDI) (available as Desmodur™ N-100 and N-3200 from Bayer Corporation, Pittsburgh, Pa.), the isocyanurate of HDI (available as Demodur™ N-3300 and Desmodur™ N-3600 from Bayer Corporation, Pittsburgh, Pa.), a blend of the isocyanurate of HDI and the uretdione of HDI (available as Desmodur™ N-3400 available from Bayer Corporation, Pittsburgh, Pa.), and mixtures thereof.

Examples of useful araliphatic polyisocyanates include, but are not limited to, those selected from the group consisting of m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, p-(1-isocyanatoethyl)-phenyl isocyanate, m-(3-isocyanatobutyl)-phenyl isocyanate, 4-(2-isocyanatocyclohexyl-methyl)-phenyl isocyanate, and mixtures thereof.

Suitable commercially available polyfunctional isocyanates are exemplified by Desmodur™ N-3200, Desmodur™ N-3300, Desmodur™ N-3400, Desmodur™ N-3600, Desmodur™ H (HDI), Desmodur™ W (bis[4-isocyanato-cyclohexyl]methane), Mondur™ M (4,4'-diisocyanato-diphenylmethane), Mondur™ TDS (98% toluene 2,4-diisocyanate), Mondur™ TD-80 (a mixture of 80% 2,4 and 20% 2,6-toluene diisocyanate isomers), and Desmodur™ N-100, each available from Bayer Corporation, Pittsburgh, Pa.

Other useful triisocyanates are those obtained by reacting three moles of a diisocyanate with one mole of a triol. For example, toluene diisocyanate, 3-isocyanatomethyl-3,4,4-trimethylcyclohexyl isocyanate, or m-tetramethylxylene diisocyanate can be reacted with 1,1,1-tris(hydroxymethyl) propane to form triisocyanates. The product from the reaction with m-tetramethylxylene diisocyanate is commercially available as CYTHANE 3160 (American Cyanamid, Stamford, Conn.).

In the preparation of the fluorinated (poly)esters the hydroxyl group containing material is reacted with at least one polycarboxylic acid or derivative thereof, such as dicarboxylic acid halides, dicarboxylic acid anhydrides, and dicarboxylic acid esters. Suitable polycarboxylic acids and derivatives thereof for use in preparing the fluorochemical composition comprise at least one aliphatic, heteroaliphatic (that is, containing in-chain heteroatoms, such as nitrogen, oxygen, or sulfur), saturated alicyclic, saturated heteroalicyclic, or polymeric moiety. The compounds can optionally contain one or more "non-interfering" groups (groups that do not interfere with the reactivity of the acyl groups, do not cause undesirable side reactions, and do not cause decomposition of the resulting fluorochemical composition), for example, alkyl, sulfonate, ester, ether, halo, haloalkyl, amide, or carbamate groups. Preferably, the compounds are aliphatic in nature.

Derivatives are sometimes preferred over acids for a variety of reasons. For example, halides provide both relatively fast reaction rates and reactions that tend to go to completion. The resulting HCl is volatile and can be removed under vacuum or by other removal means, such as by water washing.

Anhydrides can also be used. Particularly useful anhydride derivatives of dicarboxylic acids are cyclic anhydrides, which react relatively rapidly with an alcohol to form an ester and a carboxylic acid group. This allows a preponderance of monoester/monocarboxylic acid to be formed from the reaction of the cyclic anhydride with one alcohol (such as the fluorine-containing monoalcohol), followed by reaction of the remaining carboxylic acid groups with a second alcohol (such as the polyol). Alternatively, the remaining carboxylic acid groups can first be converted to the corresponding acid halide and then reacted with the second alcohol.

Representative examples of suitable dicarboxylic acids and dicarboxylic acid derivatives include the following acids and their corresponding esters, halides, and anhydrides: azelaic; maleic; fumaric; itaconic; 1,5-pent-2-enedioic; adipic; 2-methyleneadipic; 3-methylitaconic; 3,3-dimethylitaconic; sebacic; suberic; pimelic; succinic; benzylsuccinic; sulfosuccinic; gluratic; 2-methyleneglutaric; 2-sulfoglutaric; 3-sulfoglutaric; diglycolic; dilactic; 3,3'-(ethylenedioxy)dipropionic; dodecanedioic; 2-sulfodo-decanedioic; decanedioic; undecanedicarboxylic; hexade-canedicarboxylic; dimerized fatty acids (such as those obtained by the dimerization of olefinically unsaturated monocarboxylic acids containing 16 to 20 carbon atoms, for example, oleic acid and linoleic acid and the like); 1,2-, 1,4-, and 1,6-cyclohexanedicarboxylic; norbornenedicarboxylic; bi-cyclooctanedicarboxylic; and other aliphatic, heteroaliphatic, saturated alicyclic, or saturated heteroalicyclic dicarboxylic acids; and the like; and mixtures thereof. Salts (for example, alkali metal salts) of the above-described sulfonic acids can also be used.

Preferred dicarboxylic acids and dicarboxylic acid derivatives include succinic, adipic, dimer acid, azelaic acid, dodecanedioic acid, poly(ethylene glycol)diacid, poly (acrylic acid), pimelic, suberic, and sebacic acids (and derivatives thereof), and the like, and mixtures thereof; with suberic, and adipic acids (and derivatives thereof), and mixtures thereof being more preferred. Citric acid is a preferred tricarboxylic acid.

In the preparation of the polyphosphates, the hydroxyl group containing material is reacted with (poly)phosphoric acid derivatives such as dichlorophosphoric acid, tricholor-phosphor oxide, and dialkyl phosphate In the preparation of the surface treatments, the reaction product may optionally comprise at least one long chain hydrocarbon monoalcohol, monofunctional fluorochemical, water-solubilizing group containing ingredient, silane group containing ingredient, particularly in the case of polyisocyanate coreactant(s), and mixtures thereof. Alternatively, the hydroxyl group containing material, polyisocyanate, polycarboxylic acid/derivative, or phosphoric acid/derivative may be substituted to include silane groups and/or water-solubilizing groups, as previously described.

Long-chain hydrocarbon monoalcohols suitable for use in the fluoropolymer surface treatment of the present invention comprise at least one, essentially unbranched, hydrocarbon chain having from 10 to about 18 carbon atoms which may be saturated, unsaturated, or aromatic. These long-chain hydrocarbon monoalcohols can be optionally substituted, for example, with groups such as one or more chlorine, bromine, trifluoromethyl, or phenyl groups. Representative long-chain hydrocarbon monoalcohols include 1-octanol, 1-decanol, 1-dodecanol, 1-tetradecanol, 1-hexadecanol, 1-octadecanol, and the like, and mixtures thereof. Preferred long-chain hydrocarbon monoalcohols have 12 to 16 carbon atoms, with 12 to 14 carbon atoms being more preferred and 12 carbon atoms being most preferred for water solubility and performance.

Monofunctional fluorochemical compounds include those that comprise at least one $R_f$ group. The $R_f$ groups can contain straight chain, branched chain, or cyclic fluorinated alkylene groups or any combination thereof. The $R_f$ groups can optionally contain one or more heteroatoms (i.e. oxygen, sulfur, and/or nitrogen) in the carbon-carbon chain so as to form a carbon-heteroatom-carbon chain (i.e. a heteroalkylene group). Fully-fluorinated groups are generally preferred, but hydrogen or chlorine atoms can also be present as substituents, provided that no more than one atom of either is present for every two carbon atoms. It is additionally preferred that any $R_f$ group contain at least about 40% fluorine by weight, more preferably at least about 50% fluorine by weight. The terminal portion of the group is generally fully-fluorinated, preferably containing at least three fluorine atoms, e.g., $CF_3O-$, $CF_3CF_2-$, $CF_3CF_2CF_2-$, $(CF_3)_2N-$, $(CF_3)_2CF-$, $SF_5CF_2-$. Perfluorinated aliphatic groups (i.e., those of the formula $C_nF_{2n+1}-$) wherein n is 1 to 12 inclusive are the preferred $R_f$ groups, with n=6 or fewer being more preferred and with n=3 to 5 being the most preferred. Further, it is preferred that the fluorochemical monofunctional compounds have a melting point above room temperature. It has been found that the oligomers derived from solid fluorochemical monofunctional compounds exhibit higher contact angle performance than lower melting compounds.

The optional water-solubilizing compounds (W-H) comprise one or more water-solubilizing groups and at least one coreactant reactive hydrogen containing group. These water solubilizing compounds include, for example, diols and monoalcohols comprising one or more water-solubilizing groups, added in addition to the one or more polyols and one or more monoalcohols as described above.

The solubilizing groups of the water solubilizing compounds include, for example, carboxylate, sulfate, sulfonate, phosphate, phosphonate, ammonium, and quaternary ammonium groups. Such groups may be represented as $-CO_2M$, $-CH_2CH_2)_n$, $-OSO_3M$, $-SO_3M$, $-OPO_3M$, $-PO(OM)_2$, $-NR_2HX$, $-NR_3X$, $-NRH_2X$, and $-NH_3X$, respectively, wherein M is H or one equivalent of a monovalent or divalent soluble cation such as sodium, potassium, calcium, and $NR_3H^+$; X is a soluble anion such as those selected from the group consisting of halide, hydroxide, carboxylate, sulfonates, and the like; and R is selected from the group consisting of a phenyl group, a cycloaliphatic group, or a straight or branched aliphatic group having from about 1 to about 12 carbon atoms. Preferably, R is a lower alkyl group having from 1 to 4 carbon atoms. The group $-NR_3X$ is a salt of a water-soluble acid, for example trimethyl ammonium chloride, pyridinium sulfate, etc. or an ammonium substituent. The group $-NR_2HX$ is the salt of a water-soluble acid, such as dimethyl ammonium acetate or propionate. The group $-NRH_2X$ is the salt of a water-soluble acid, such as methyl ammonium acetate or propionate. The group $-NH_3X$ is the salt of a water-soluble acid, such as ammonium acetate or propionate. The salt form can be made by simple neutralization of the acid group with a base such as an amine, a quaternary ammonium hydroxide, an alkali metal carbonate or hydroxide, or the like; or alternatively by simple reaction of the amino group with a carboxylic acid, a sulfonic acid, a halo acid, or the like. Carboxylic acid groups in salt form are preferred because they have been found to impart water solubility to the chemical compositions of the present invention without causing undue loss of the durable stain-release properties imparted by the chemical composition.

In the case of (poly)urethanes, the isocyanate-reactive hydrogen containing group is selected from the group consisting of $-OH$, $-SH$, $NH_2$, and NRH wherein R is selected from the group consisting of a phenyl group, a cycloaliphatic group, or a straight or branched aliphatic group having from about 1 to about 12 carbon atoms. Preferably, R is a lower alkyl group having from 1 to 4 carbon atoms. A representative suitable diol with a solubilizing group is 1,1-bis(hydroxymethyl)propionic acid and its salts such as its ammonium salt. A representative suitable monoalcohol with a solubilizing group is glycolic acid ($HOCH_2COOH$) and its salts. The amount of water-solubilizing group should be sufficient to solubilize the chemical composition. Typically, the isocyanate:solubilizing group ratio should be from about 3:1 to about 16:1, preferably from about 5:1 to about 11:1. Illustrative water-solubilizing compounds having suitable water-solubilizing groups include, but are not limited to, those independently selected from the group consisting of $HOCH_2COOH$; $HSCH_2COOH$; $(HOCH_2CH_2)_2NCH_2COOH$; $HOC(CO_2H)(CH_2CO_2H)_2$; $(H2N(CH_2)_nCH_2)_2NCH_3$ wherein n is an integer of 1 to 3; $(HOCH_2)_2C(CH_3)COOH$; $(HO(CH_2)_nCH_2)_2NCH_3$ wherein n is an integer of 1 to 3; $HOCH_2CH(OH)CO_2Na$; N-(2-hydroxyethyl)iminodiacetic acid ($HOCH_2CH_2N(CH_2COOH)_2$); L-glutamic acid ($H_2NCH(COOH)(CH_2CH_2COOH)$); aspartic acid ($H_2NCH(COOH)(CH_2COOH)$); glycine ($H_2NCH_2COOH$); 1,3-diamino-2-propanol-N,N,N',N'-tetraacetic acid ($HOCH(CH_2N(CH_2COOH)_2)_2$); iminodiacetic acid ($HN(CH_2COOH)_2$); mercaptosuccinic acid ($HSCH(COOH)(CH_2COOH)$); $H_2N(CH_2)_4CH(COOH)N(CH_2COOH)_2$; $HOCH(COOH)CH(COOH)CH_2COOH$; $(HOCH_2)_2CHCH_2COO)^-(NH(CH_3)_3)^+$; $CH_3(CH_2)_2CH(OH)CH(OH)(CH_2)_3CO_2K$; $H_2NCH_2CH_2OSO_3Na$; $H_2NC_2H_4NHC_2H_4SO_3H$; $H_2NC_3H_6NH(CH_3)C_3H_6SO_3H$; $(HOC_2H4)_2NC_3H_6OSO_3Na$; $(HOCH_2CH_2)_2NC_6H_4OCH_2CH_2OSO_2OH$; N-methyl-4-(2,3-dihydroxypropoxy)pyridinium chloride, $((H_2N)_2C_6H_3SO_3)^-(NH(C_2H_5)_3)^+$; dihydroxybenzoic acid; 3,4-dihydroxybenzylic acid; 3-(3,5-dihydroxyphenyl) propionic acid; salts of the above amines, carboxylic acids, and sulfonic acids; and mixtures thereof.

The optional silane groups that may be included in the synthesis of the (poly)urethanes are preferably of the following formula (I):

$$X^1-R^3-Si-(Y)_3 \qquad \text{(formula II)}$$

wherein:

$X^1$ is $-NH_2$; $-SH$; $-OH$; $-N=C=O$; or $-NR^4H$ where $R^4$ is a phenyl, straight or branched aliphatic, alicyclic, or aliphatic ester group;

$R^3$ is an alkylene, heteroalkylene, aralkylene, or heteroaralkylene group; and each Y is independently a hydroxy; a hydrolyzable moiety selected from alkoxy, acyloxy, heteroalklyoxy, heteroacyloxy, halo, and oxime; or a non-hydrolyzable moiety selected from the group consisting of phenyl, alicyclic, straight-chain aliphatic, and branched-chain aliphatic, wherein at least one Y is a hydrolyzable moiety.

Representative divalent bridging radicals ($R^3$) include, but are not limited to, those selected from the group consisting of $-CH_2CH_2-$, $-CH_2CH_2CH_2-$, $-CH_2CH_2CH_2OCH_2CH_2-$, $-CH_2CH_2C_6H_4CH_2CH_2-$, and $-CH_2CH_2O(C_2H_4O)_2CH_2CH_2N(CH_3)CH_2CH_2CH_2-$.

Representative examples of hydroxy-reactive silane compounds include, but are not limited to, 3-isocyanatopropyltriethoxysilane, 3-isocyanatopropyltrimethoxysilane, and the like.

The surface treatments comprising urethane linkages (e.g. polyurethanes), ester linkages (e.g. (poly)esters) or phosphate linkages can be made according to known techniques such as described in U.S. Pat. No. 3,094,547; U.S. patent application Ser. No. 09/803,708 filed Mar. 9, 2001; and U.S. patent application Ser. No. 09/804,447 filed Mar. 12, 2001.

When the surface treatment contains comprises one or more carboxylic acid groups, solubility of the composition in water can be further increased by forming a salt of the carboxylic acid group(s). Basic salt-forming compounds, such as tertiary amines, quaternary ammonium hydroxides, and inorganic bases, including, but not limited to, those selected from the group consisting of sodium hydroxide, potassium hydroxide, cesium hydroxide, lithium hydroxide, calcium hydroxide, magnesium hydroxide, zinc hydroxide, and barium hydroxide, may be used in a sufficient amount (i.e., in an amount to maintain a pH of greater than about 6). These basic salt-forming compounds preferably can be added in the water phase, but optionally in the preparation of the urethane oligomers, to form salts with the incorporated, pendant and/or terminal carboxylic acid groups on the urethane oligomer. Examples of useful amine salt-forming compounds include, but are not limited to, those selected from the group consisting of ammonia, trimethylamine, triethylamine, tripropylamine, triisopropylamine, tributylamine, triethanolamine, diethanolamine, methyidiethanolamine, morpholine, N-methylmorpholine, dimethylethanolamine, and mixtures thereof. Preferred salt forming compounds include those selected from the group consisting of ammonia, trimethylamine, dimethylethanolamine, methyidiethanolamine, triethylamine, tripropylamine, and triisopropylamine, since the chemical compositions prepared therefrom are not excessively hydrophilic upon coating and curing. Since certain salts formed by the reaction of salt forming compounds, such as potassium hydroxide in combination with a carboxylic acid group, could result in undesired reaction with NCO groups, it is preferred to add the salt forming compound in a water phase after all of the diols, alcohol, and silane compounds have been reacted with the NCO groups of the polyfunctional isocyanate compound.

The fluorochemical described herein for use as surface treatment for optical elements are typically solids. The fluoropolymer(s) are combined with various solvents to form emulsion(s), solution(s) or dispersion(s). Dispersions of fluoropolymers can be prepared using conventional emulsion polymerization techniques, such as described in The emulsion(s), solution(s), and dispersion(s) are then further diluted in order to deliver the desired concentration. It is assumed that negligible amounts of the diluted surface treatment are lost and substantially all of the surface treatment present in the emulsion, solution or dispersion is deposited on the optical elements. Hence, the concentration (ppm) based on the weight of the optical elements being coated with the emulsion, solution, or dispersion is approximately equal to the amount retained on the optical elements upon evaporation of the solvent. Although aqueous emulsions, solutions, and dispersions are preferred, up to about 50% of a cosolvent such as ethanol, methanol, ethyl acetate, n-methyl pyrrolidone, isopropanol, or methyl perfluorobutyl ether may be added. Preferably, the aqueous emulsions, solutions, and dispersions comprise less than about 30% cosolvent, more preferably less than about 10% cosolvent, and most preferably the aqueous emulsions, solutions, and dispersions are substantially free of cosolvent. The aqueous surface treatment is coated on the optical elements typically by combining the optical elements with the minimum volume of aqueous surface treatment to uniformly coat the optical elements and then drying the coated elements. Although aqueous delivery is preferred, the surface treatment could also be applied from 100% organic solvent as well as by other techniques such as vapor deposition.

The amount of fluoropolymer surface treatment employed for coating the optical elements typically ranges from about 5 ppm to about 1000 ppm with respect to the weight of the optical elements. A preferred fluorochemical compound is one that contributes the desired floatation at minimum concentrations. The amount of fluorochemical derivative is usually about 600 ppm or less, preferably about 300 ppm or less, more preferably about 150 ppm, even more preferably about 100 ppm, and most preferably about 50 ppm or less. Typically, the overall coating thickness of the surface treatment of the present invention is greater than about 15 Angstroms, preferably, greater than about 20 Angstroms, and more preferably, greater than about 50 Angstroms. Thicker coatings can be obtained if desired, although it is preferred that the coating thickness be no greater than about 500 Angstroms, more preferably, no greater than about 300 Angstroms, and most preferably, no greater than about 150 Angstroms thick. Excessive concentrations of surface treatment can result in agglomeration of the optical elements. Such limits can be determined by routine experimentation and in some instances the agglomeration can be reduced by the use of flow control agents.

The surface treatment may comprise any one of fluorochemicals described herein, various blends of such fluorochemicals, as well blends of such fluorochemicals with other surface treatments. Accordingly, the optical elements may comprise one or more additional surface treatments such as adhesion promoters and flow control agents that reduce particle agglomeration. Various silanes such as 3-aminopropyltriethoxysilane are commonly employed as adhesion promoters, whereas methacrylato chromic chloride, commercially available from Zaclon Inc, Cleveland, Ohio under the trade designation "Volan" is a typical flow control agent.

The surface treated optical elements of the invention can be employed for producing a variety of reflective products or articles such as pavement markings, retroreflective sheeting, and beaded projection screens. Such products share the common feature of comprising a liquid binder layer and embedding a multitude of optical elements into the binder surface followed by solidifying the binder to retain the optical elements in place. In the pavement markings, retroreflective sheeting, and beaded projection screens of the invention, at least a portion of the optical elements will comprise the surface treated optical elements of the invention. Typically, the majority of, and preferably substantially all, the optical elements employed in the manufacture of the reflective products will comprise the surface treated optical elements of the invention.

Various known binder materials may be employed including various one and two-part curable binders, as well as thermoplastic binders wherein the binder attains a liquid state via heating until molten. Common binder materials include polyacrylates, methacrylates, polyolefins, polyurethanes, polyepoxide resins, phenolic resins, and polyesters. For reflective paints the binder may comprise reflective pigment. For reflective sheeting, however, the binder is typically transparent. Transparent binders are applied to a reflective base or may be applied to a release-coated support, from which after solidification of the binder, the beaded film is stripped and may subsequently be applied to a reflective base or be given a reflective coating or plating.

There are several types of retroreflective articles in which the surface treated optical elements may be used such as exposed lens (e.g. U.S. Pat. Nos. 2,326,634 and 2,354,018), embedded lens (e.g. U.S. Pat. No. 2,407,680), and encapsulated lens (e.g. U.S. Pat. No. 4,025,159) retroreflective sheeting. Retroreflective articles can be prepared by known methods including a method comprising the steps of: (i) forming a top coat on a release coated web (e.g. coating a solution of hydroxy-functional acrylic polyol and aliphatic polyfuntional isocyanate onto a release-coated paper web and then curing by conveying the coating through an oven at about 150° C. for about 10 minutes); (ii) coating the exposed surface of the top coat with a liquid binder (e.g. coating a solution comprising an oil-free synthetic polyester resin and a butylated melamine resin); (iii) drying the binder to form an uncured tacky bead-bond layer; (iv) cascade-coating onto the bead-bond layer a plurality of glass microspheres forming a monolayer of embedded glass microspheres; (v) curing the bead-containing bead-bond layer to a non-tacky state (e.g. by heating to 150° C.); forming a space coat layer over the bead-containing bead-bond layer (e.g. coating a 25% solids solution comprised of a polyvinylbutyral resin and a butylated melamine resin in a solvent and curing at 170° C. for about 10 minutes); (vi) applying a reflective layer over the space coat layer (e.g. vapor deposition of aluminum metal at a thickness of about 100 nm); and stripping away the release-coated web. An adhesive layer is typically applied to the reflective layer (e.g. by coating a 0.025 mm thick layer of an aggressive acrylic pressure-sensitive adhesive onto a silicone-treated release liner and pressing the adhesive against the reflective layer).

The surface treated optical elements are also useful in pavement marking materials. The optical elements can be incorporated into coating compositions that generally comprise a film-forming material having a multiplicity of optical elements dispersed therein. The surface treated optical elements may also be used in drop-on applications for such purposes as highway lane striping in which the optical elements are simply dropped onto wet paint or hot thermoplastic and adhered thereto.

One typical pavement marking sheet is described in U.S. Pat. No. 4,248,932. This sheet material is a prefabricated strip adapted to be laid on and secured to pavement for such purposes as lane dividing lines and comprises a base sheet, such as a soft aluminum foil which is conformable to a roadway surface; a top layer (also called the support film or binder film) adhered to one surface of the base sheet and being very flexible and resistant to rupture; and a monolayer of surface treated optical elements such as transparent microsphere lens elements partially embedded in the top layer in a scattered or randomly separated manner. The pavement marking sheet construction may also include an adhesive (e.g., pressure sensitive, heat or solvent activated, or contact adhesive) on the bottom of the base sheet. The base sheet may be made of an elastomer such as acrylonitrile-butadiene polymer, polyurethane, or neoprene rubber. The top layer in which the surface treated microspheres are embedded is typically a polymer such as vinyl polymers, polyurethanes, epoxies, and polyesters. Alternatively, the surface treated microsphere lenses may be completely embedded in a layer of the pavement marking sheet.

Pavement marking sheets may be made by processes known in the art (see e.g. U.S. Pat. No. 4,248,932), one example comprising the steps of: (i) coating onto a base sheet of soft aluminum (50 micrometers thick) a mixture of resins (e.g., epoxy and acrylonitrile butadiene elastomer mixture), pigment ($TiO_2$) and solvent (e.g., methyl ethyl ketone) to form the support film; (ii) dropping onto the wet surface of the support film ingredients a multiplicity of the surface treated optical elements of the invention; and curing the support film at 150° C. for about 10 minutes. A layer of adhesive is then usually coated on the bottom of the base sheet.

Pigments or other coloring agents may be included in the top layer in an amount sufficient to color the sheet material for use as a traffic control marking. Titanium dioxide will typically be used for obtaining a white color; whereas, lead chromate will typically be used to provide a yellow color.

A rear projection screen is a sheet-like optical device having a relatively thin viewing layer that is placed at an image surface of an optical projection apparatus. Rear projection screen displays comprising glass microspheres embedded in an opaque matrix are known from U.S. Pat. No. 2,378,252, for example. Generally, the size of the microspheres is less than about 150 microns. For maximum brightness, the microspheres have an index of refraction of less than about 1.8 and preferably from about 1.45 to about 1.75. A plurality of the surface treated glass microspheres are attached to and are in intimate contact with a major surface of a transparent substrate. Alternatively, a diffusion layer can be formed by coating an optically inhomogeneous material as a separate layer onto the transparent substrate prior to application of the opaque binder and microspheres. Rear projection screens are prepared by i) providing a substrate (e.g. polyester, polycarbonate) having an opaque binder disposed thereon (e.g. acrylate loaded with carbon black to make it opaque); and ii) applying the surface treated glass microspheres under conditions effective to produce microspheres in optical contact with the substrate and embedded in the opaque matrix.

In some useful embodiments of the invention, a specular reflective means is provided by a layer of metal (e.g. aluminum) vapor-deposited on the surface treated microspheres. Another useful specular reflective means is a dielectric reflector which comprises one or more layers of a transparent material behind the microspheres, each layer having a refractive index of about 0.3 higher or lower than that of the adjacent layer or beads and each layer having an optical thickness corresponding to an odd numbered multiple of about 1/4 wavelength of light in the visible range. More detail on such dielectric reflectors is found in U.S. Pat. No. 3,700,305.

EXAMPLES

Following is a list of ingredients employed in the preparation of the fluorochemical surface treatments.

Fluorochemicals

PBSF—$C_4F_9SO_2F$, perfluorobutanesulfonyl fluoride, available from Sigma-Aldrich, Milwaukee, Wis.

$C_4F_9SO_2NH_2$—a fluorochemical sulfonamide, can be prepared by reacting PBSF with an equimolar amount of $NH_3$.

MeFBSE—C$_4$F$_9$SO$_2$N(CH$_3$)CH$_2$CH$_2$OH, a fluorochemical alcohol having an equivalent weight of 357, can be made in two stages by reacting PBSF with methylamine and ethylenechlorohydrin, using a procedure essentially as described in Example 1 of U.S. Pat. No. 2,803,656 (Ahlbrecht, et al.).

FBSEE—C$_4$F$_9$SO$_2$N(C$_2$H$_4$OH)$_2$, a fluorochemical diol, can be prepared as described in Example 8 of U.S. Pat. No. 3,787,351 (Olson), except that an equimolar amount of C$_4$F$_9$SO$_2$NH$_2$ is substituted for C$_8$F$_{17}$SO$_2$NH$_2$.

FHSEE—C$_6$F$_{13}$SO$_2$N(C$_2$H$_4$OH)$_2$, a fluorochemical diol, can be prepared as described in Example 8 of U.S. Pat. No. 3,787,351 (Olson), except that an equimolar amount of C$_6$F$_{13}$SO$_2$NH$_2$ is substituted for C$_8$F$_{17}$SO$_2$NH$_2$.

HOCH$_2$(CF$_2$)$_3$CH$_2$OH—a fluorochemical diol, can be prepared as described by McBee et al., *J. Am. Chem. Soc.*, vol. 74, p. 444 (1952).

c-C6F11CH$_2$OH—(perfluorocyclohexy)methanol, available from ABCR GmbH & CO. KG, GERMANY.

n-C5F11CH$_2$OH—prepared by reduction from n-C5F11CO$_2$H as described in U.S. Pat. No. 2,666,797 (1954).

C6F13C2H4OH—available from Sigma-Aldrich.

Non-fluorinated Hydroxyl Group Containing Materials

1-Octadecanol—C$_{18}$H$_{37}$OH, available from Sigma-Aldrich, Milwaukee, Wis.

HDO—hexanediol, HO(CH$_2$)$_6$OH, available from Sigma-Aldrich.

75-H-450—a diol having an average molecular weight of 980, made by randomly copolymerizing ethylene oxide and propylene oxide, available as UCON™ 75-H-1400 fluid from Union Carbide Corp., S. Charleston, W.Va.

PEG—poly(ethylene glycol), available from Sigma-Aldrich.

BDO—butanediol, HO(CH$_2$)$_4$OH, available from Sigma-Aldrich.

DMPA—2,2-bis(hydroxymethyl)propionic acid, available from Sigma-Aldrich, Milwaukee, Wis.

(CF3)2C(PhOH)2, available from Sigma-Aldrich.

Diisocyanates

BDI—tetramethylene 1,4-diisocyanate, O=C=N—(CH$_2$)$_4$—N=C=O, available from Sigma-Aldrich.

HDI—hexamethylene 1,6-diisocyanate, O=C=N—(CH$_2$)$_6$—N=C=O, available from Sigma-Aldrich.

ODI—octamethylene 1,8-diisocyanate, O=C=N—(CH$_2$)$_8$—N=C=O, available from Sigma-Aldrich.

DDI—dodecane 1,12-diisocyanate, O=C=N—(CH$_2$)$_{12}$—N=C=O, available from Sigma-Aldrich.

MDI—diphenylmethane 4,4'-diisocyanate, available as Mondur™ M from Bayer Corporation, Pittsburgh, Pa.

H$_{12}$MDI—dicyclohexylmethane diisocyanate, available as Desmodur™ W from Bayer Corp.

IPDI—isophorone diisocyanate, [5-isocyanatio-1-(isocyanatomethyl)-1,3,3-trimethylcyclohexane], available from Sigma-Aldrich.

TMXDI—m-tetramethyl xylylene diisocyanate, available from available from Sigma-Aldrich.

Triisocyanates

N-100—a triisocyanate that is the biuret of HDI, available as Desmodur™ N-100 from Bayer Corp.

N-3300—a triisocyanate that is the isocyanurate of HDI, available as Desmodur™ N-3300 from Bayer Corp.

N-3400—a diisocyanate that is the uretdione of HDI, available as Desmodur™ N-3400 from Bayer Corp.

N-3600—Desmodur™ N-3600, a hexamethylene-1,6-diisocyanate based polyfunctional isocyanate compound with an NCO equivalent weight of 183, available from Bayer Corporation, Pittsburgh, Pa.

Polycarboxylic Acids

CA—Citric acid, HOC(CO$_2$H)(CH$_2$CO$_2$H)$_2$, available from Sigma-Aldrich, Milwaukee, Wis.

ADA or AA—adipic acid, HOOC(CH$_2$)$_4$COOH, available from Sigma-Aldrich.

SBA or SA—suberic acid, HOOC(CH$_2$)$_6$COOH, available from Sigma-Aldrich.

Phosphoric Acid Derivatives

P(O)Cl3—phosphorus oxychloride, available from Sigma-Aldrich.

Other Ingredients

GA—glycolic acid, HOCH$_2$COOH, available from Sigma-Aldrich.

APTES or NSi—3-Aminopropyltriethoxysilane, available from Sigma-Aldrich, Milwaukee, Wis.

DS-10—SIPONATE™ DS-10 surfactant (sodium dodecylbenzenesulfonate), available from Rhone-Poulenc, Princeton, N.J.

NH2C3H6Si(OEt)3, available from Sigma-Aldrich. OCNC3H6Si(OEt)3-3-isocyanatopropyltriethoxylsilane, available from Gelest, Inc., Tullytown, Pa.

The description of the synthesis of each of the surface treatments is as follows: The nomenclature "2/3/4 MeFBSE/FBSEE/HDI", for example, refers to the molar ratio of each of the reactants present in the end product. Hence, for "Fluorinated Polyurethane 1" the end product contains 2 moles of MeFBSE, 3 moles of FBSEE and 4 moles of HDI.

Fluorinated Polyurethane 1 2/3/4 MeFBSE/FBSEE/HDI

Into a 100 mL flask equipped with stirrer, heating mantle, thermometer, condenser and nitrogen purge were added 1.677 g (10 mmol) of HDI, 2.792 g (7.5 mmol) of FBSEE, 1.782 g (5 mmol) of MeFBSE and 15 g of EtOAc. After all the solids were dissolved, 2 drops of dibutyltin dilaurate catalyst were added. Then the mixture was reacted at 60° C. for 4 hours with stirring, after which the solution turned slightly cloudy and more precipitation occurred at room temperature. The reaction was found to have run to completion as monitored by FTIR analysis. A 3% solution was prepared for glass beads floating evaluation.

Fluorinated Polyurethane 2 2/2/3 MeFBSE/FBSEE/DDI

Into a 50 mL flask equipped with stirrer, heating mantle, thermometer, condenser and nitrogen purge were added 1.512 g (6 mmol) of (DDI), 1.431 g (4 mmol) of MeFBSE, 1.493 g (4 mmol) of FBSEE, 25 g of EtOAc and 2 drops of dibutyltin dilaurate. The mixture was stirred at 65° C. for 4 hours, after which the reaction was found to have run to completion as monitored by FTIR analysis. By GPA analysis, $M_n$=2050 and $M_w$=2950. With DC-10, an emulsion solution was prepared for evaluation.

Fluorinated Polyurethane 3 1/2/3.8/1 FBSEE/ N3600/MeFBSE/NH2C3H6Si(OEt)3

In a 250 ml bottle flashed with N2, added 3.77 g (0.01 mol) FBSEE, 12.44 g N3600 (0.068 eq. NCO), 13.56 g (0.038 mol) MeFBSE, 50 g EtOAc and 3 drops of "Sn" catalyst. The mixture was stirred with a magnetic stir bar, and reacted at 60C for one hour. After cooling down to room temperature, 2.21 g (0.01 mol) NH2C3H6Si(OEt)3 were added under N2. The mixture was reacted at 60C for 4 hours. FTIR analysis of the mixture showed that no —NCO group left. A 3% solid sample was prepared by addition of more EtOAc, and solution was used for floating evaluation of glass beads.

Fluorinated Polyurethane 4 2/1/2.8/1.8/0.2 N3300/ FBSEE/MeFBSE/GA/APTES

To a 250 ml flask equipped with a heating mantel, magnetic stirring bar, nitrogen inlet, and temperature controller was added with stirring 13.5 grams (0.0692 equivalent) of Desmodur™ N-3300 (N3300), 3.77 grams (0.010 mole) FBSEE and 29.5 grams of N-methyl pyrrolidone. While still at room temperature the mixture became a homogeneous solution. Dibutyltin dilaurate (4 drops) was then added, and the mixture was heated to 70° C. and allowed to react for 1 hour. MeFBSE (10.0 grams, 0.028 mole) and 1.37 grams (0.018 mole, 0.018 equivalent) of glycolic acid (GA) were added to the reaction mixture, and reaction was continued for another hour. 3-Aminopropyltriethoxysilane (APTES) (0.44 grams, 0.002 mole, 0.002 equivalent) was then added to the reaction mixture and allowed to react for an additional 1 hour. The mixture was diluted with ethanol for evaluation.

Fluorinated Polyurethane 5 1/1.6/3.1/0.3 DMPA/ N3300/MeFBSE/NSi

To a 250 ml flask equipped with a heating mantel, magnetic stirring bar, nitrogen inlet, and temperature controller was added 10.48 g (0.054 equivalent) of Desmodur™ N-3300 (N3300), 1.35 g (0.010 mole) 2,2-bis(hydroxymethyl) propionic acid (DMPA), 11.07 g (0.031 mole) MeFBSE and 30.5 grams of ethyl acetate. Dibutyltin dilaurate (4 drops) was added when all solids were dissolved. The mixture was heated to 60° C. and allowed to react for 1 hour. 3-Aminopropyltriethoxysilane (APTES) (0.66 grams, 0.003 mole) was then added to the reaction mixture and allowed to react for an additional 1 hours. A solution of 1.85 grams (0.0155 equivalent) methyldiethanolamine in 98.5 grams deionized water was then added to the reaction mixture at 60° C., and the mixture was stirred at 60° C. for 10 minutes (~20% by weight chemical composition solids). The hot clear solution was poured into 161 grams deionized water to make a 10% by weight chemical composition solution after strip out ethyl acetate. This solution was further diluted with deionized water to a 3% by weight before evaluation.

Fluorinated Polyurethane 6 1/2/4 DMPA/N3300/ MeFBSE

Similarly, 11.64 g (0.06 equivalent) of Desmodur™ N-3300 (N3300) was reacted with 1.35 g (0.010 mole) 2,2-bis(hydroxymethyl) propionic acid (DMPA) and 14.28 g (0.04 mole) MeFBSE in 35 grams of ethyl acetate and Dibutyltin dilaurate (4 drops) at 60° C. for 1 hour. The solution was diluted with more ethyl acetate for evaluation.

Fluorinated Urethane 7 1/3 N3300/MeFBSE

Similarly, 11.64 g (0.06 equivalent) of Desmodur™ N-3300 (N3300) was reacted with 21.42 g (0.06 mole) MeFBSE in 80 g of ethyl acetate in the presence of dibutyltin dilaurate (4 drops) at 60° C. for 1 hour. The ~29% solid solution was diluted with more ethyl acetate for evaluation.

Fluorinated Polyurethane 8

Commercially available from 3M Company, St. Paul, Minn. under the trade designation "PM-1396".

Fluorinated Polyurethane 9 1.9/0.1/2/3 FBSEE/(75-H-450)/MeFBSE/HDI

UCON Lubricant (75-H-450) is a low molecular co-polymer diol from ethylene glycol and propylene oxide manufactured by Union Carbide with average molecular weight 980. Similarly, 5.03 g (1.5 mmol) UCON Lubricant (75-H-450, slightly cloudy, 5.1 mmol), 35.9 g (95.23 mmol) FBSEE, and 35.28 g (98.82 mmol) MeFBSE were reacted with 25.3 g (150.595 mmol) HDI in 405 g EMK at 65° C. for 4 hours under $N_2$ with 0.5 g dibutyltin dilaurate catalyst. A clear solution (30% solid) was obtained. From FTIR, no NCO signal was observed. Half of the solution was emulsified in the presence of 1.0 g Arquad 2HT-75 and 250 g water by ultrasonic process.

Fluorinated Polyurethane 10 1/4/2 FBSEE/ MeFBSE/N3400

234.7 g (1.216 eq. NCO) N3400 was reacted with 76 g (0.1964 mol) FBSEE and 286.1 g (0.8014 mol) MeFBSE in 800 g EtOAc with 1 g drops of dibutyltin dilaurate catalyst at 60° C. for 4 hour under $N_2$. The reaction was monitored by FTIR, and no NCO signal was observed. A 2500 g (22.7%) emulsion was prepared by ultrasonic in the presence of 23.7 g DS-10.

Fluorinated Polyurethane 11 1/4/2 (CF3)2C(PhOH) 2/MeFBSE/N3300

Similarly, 5.82 g (30 eq. NCO) N3300 was reacted with 1.14 g (5 mmol) $(CH_3)_2C(PhOH)2$ in 20 g EtOAc with 2 drops of dibutyltin dilaurate catalyst at 70° C. for 0.5 hour under $N_2$. Then, 7.14 g (20 mmol) MeFBSE was added, and the mixture was reacted for another 5 hours. The reaction was monitored by FTIR, and no NCO signal was observed.

Fluorinated Polyurethane 12 5/4/2 FBSEE/HDI/ OCNC3H6Si(OEt)3

1.65 g (6.7 mol) HDI was reacted with 6.28 g (16.2 mmol) FBSEE and 1.65 g (6.7 mmol) OCNC3H6Si(OEt)3 in 50 g EtOAc with 3 drops of dibutyltin dilaurate catalyst at 60° C. for 4 hour under $N_2$. The reaction was monitored by FTIR, and no NCO signal was observed.

Fluorinated Polyurethane 13 N3300/ C6F13C2H4OH 72.8 g C6F13C2H4OH (0.2 mol) was reacted with 38.4 g N3300 (0.2 eq NCO) in 100 g MIBK in the presence of 7 drops "Sn" catalyst at 70C for 4 hrs. FTIR analysis of the reaction mixture showed no —NCO signal. The solution was emulsified with 4.5 g DS-10 and 450 g of water. Strip of solvent, a 490 g emulsion was obtained (~22% solid), which was used for the evaluation of glass beads floating.

Fluorinated Polyester 14 3/1 MeFBSE/HO—C(CH2CO2H)2—CO2H

In a 250 ml three-neck reaction flask equipped with stirrer, heater and condenser with water trap were added 5.358 g (15 mmol) of MeFBSE, 1.057 g (5 mmol) of citric acid and 100 g toluene solvent. Then, three drops of $CF_3SO_3H$ was added. The reaction was heated to reflux for 10 hours, and the formed water was removed. From FTIR analysis, no more —CO2H was observed. NaHCO3 (0.5 g) was added in order to remove the catalyst when the solution cooled down to 70° C., and the mixture was stirred for another 20 minutes. The solid was removed by filtration and the obtained solution was rotary evaporated to strip off the solvent. The residue solid was dissolved in EtOAc for beads floating evaluation.

Fluorinated Polyester 15 1/1 FBSEE/Suberic Acid

Similarly, 1.90 g FBSEE (5 mmol) was reacted with 0.876 g (5 mmol) suberic acid in 100 g toluene and 3 drops of $CF_3SO_3H$. The reaction was heated to reflux for 10 hours and monotered by FT-IR spectrum, and the formed water was removed. Filtration after the treatment with NaHCO3 base, the solution was rotary evaporated to dry, and the solid was dissolved in ethyl acetate for beads evaluation.

Fluorinated Polyester 16 0.2/0.8/1 FHSEE/FBSEE/AA

Similarly, 0.95 g FHSEE [C6F13SO2N(C2H4OH)2, 2 mmol] and 2.98 g FBSEE [C4F9SO2N(C2H4OH)2, 8 mmol] were reacted with 1.46 g (10 mmol) adipic acid (AA) in 100 g toluene and 3 drops of $CF_3SO_3H$. The obtained polyester solid was dissolved in ethyl acetate for beads evaluation.

Fluorinated Polyester 17 MeFBSE—AA—FBSEE—OC(O)CH=CH2

Similarly, 17.85 g MeFBSE (50 mmol) and 18.85 g FBSEE (50 mmol were reacted with 7.30 g (50 mmol) adipic acid (AA) and 3.60 g acrylic acid (50 mmol) in 250 g toluene and 5 drops of $CF_3SO_3H$ under reflex fo 10 hours. After treatment with CaO and filtration, the mixture was polymerized by addition 0.2 g Vazo-64 under nitrogen. The obtained solution was diluted with ethyl acetate to 1% for glass beads evaluation.

Fluorinated Polyphosphate 18 (c—C6F11CH2O)2P(O)ONH4

In a 250 ml flask, 13.5 g POCl3 (88.2 mmol) and 4.13 g toluene were added under N2. The mixture was cooled with an ice-bath to 0–5C, and 1.55 g (86.1 mmol) water was slowly added while stirring. The reaction was continued for one hour at below 10C. Then, 53.7 g c-C6F11CH2OH (172.1 mmol) in 21.4 g toluene was added. The mixture was reacted at 100C for 16 hours. Distillation under vacuum, the solvent toluene was removed. The obtained solid was dissolved in 35 ml IPA, and the pH was adjusted with NH3—H2O to ~9. Further dilution with H2O—IPA co-solvent, the solution was evaluated for glass beads floating.

Fluorinated Polyphosphate 19 (n—C5F11CH2O)2P(O)ONH4

Similarly, 15 g POCl3 (97.8 mmol) in 5 g toluene was reacted with water 1.8 g (97.8 mmol) water at ~5C for one hour, then reacted with 58.71 g n-C5F11CH2OH (195.7 mmol) in 25 g toluene at 100C for 24 hours. Distillation under vacuum, the solvent toluene was removed. The obtained solid was dissolved in 35 ml IPA, and the pH was adjusted with NH3—H2O to ~9. Further dilution with H2O—IPA co-solvent, the solution was evaluated for glass beads floating.

Fluorinated Polyphosphate 20 (N H4O)2P(O)—FBSEE—P(O)(ONH4)2

Similarly, 7.65 g POCl3 (50 mmol) in 10 g toluene was reacted with water 0.9 g (5 mmol) water at ~5C for one hour, then reacted with 9.33 g FBSEE (25 mmol) in 50 g toluene at 100C for 24 hours. Distillation under vacuum, the solvent toluene was removed. The obtained solid was dissolved in 35 ml IPA, and the pH was adjusted with NH3—H2O to ~9. Further dilution with H2O—IPA co-solvent, the solution was evaluated for glass beads floating.

Fluorinated Polyphosphate 21 MeFBSE—P(O)(ONH4)—[FBSEE—P(O)(ONH4)]2—MeFBSE

Similarly, the reactants of FBSEE, POCl3, H2O and MeFBSE were reacted in ratio of 2/3/2/2. The obtained polyephosphate IPA-H2O solution was evaluated for glass beads floating.

Fluorinated Polyphosphate 22 MeFBSE—P(O)(ONH4)—(OCH2C3F6CH2O)—P(O)(ONH4)—MeFBSE Similarly, HO—CH2CF2CF2CF2CH2—OH was used in replacement of FBSEE, and reacted with POCl3, water, and MeFBSE in ratio of 1/2/1.5/2.5. The obtained polyephosphate IPA—H2O solution was evaluated for glass beads floating.

Fluorinated Polyphosphate 23 FHSEE/P(O)Cl3/H2O

Similarly, 15.3 g POCl3 (100 mmol) in 10 g toluene was reacted with water 1.8 g (100 mmol) water at ~5C for one hour, then reacted with 23.65 g FHSEE (50 mmol) in 50 g toluene at 100C for 24 hours. Distillation under vacuum, the solvent toluene was removed. The obtained solid was dissolved in 35 ml IPA, and the pH was adjusted with NH3—H2O to ~9. Further dilution with H2O—IPA co-solvent, the solution was evaluated for glass beads floating.

Fluorinated Polyphosphate 24 (MeFBSE)2P(O)ONH4

In a 250 ml flask equipped with a magnetic stirrer, a thermometer and a condenser connected with a nitrogen flow, was charged with 15.3 g POCl3 (0.1 mol) and 5 g toluene. The solution was cooled with an ice-water bath to <10C, and added 1.8 g (0.1 mol) of water in portion while maintain the temperature below 10C. After addition, the mixture was reacted at this temperature for two hours. Then, 70.5 g (0.2 mol) MeFBSE and 50 g CH3CN were added, and the mixture was heated to 80C for 10 hours. Strip out solvent, the obtained solid was dissolved in IPA and water (~30% solid). The pH was adjusted with NH3—H2O to ~8.5. The solution was further diluted for the evaluation of glass beads floating.

Fluorinated Polyphosphate 25 MeFBSE—P(O)(ONH4)—FBSEE—P(O)(ONH4)—MeFBSE

Similarly, 15.3 g (0.1 mol) POCl3 was reacted with 1.8 g (0.1 mol) of water in 5 g toluene at <10C for two hours. Then, 19.15 g (0.05 mol) FBSEE, 35.6 g (0.1 mol) MeFBSE and 50 g CH3CN were added at room temperature. The mixture was reacted at 80C for 15 hours. Strip off the solvent, the obtained solid was dissolved in IPA-water with adjusted pH to ~8.5 (~30% solid). The solution was further diluted with IPA-water for the evaluation of glass beads floating.

Test Methods

1. Heptane Floatation—A single layer of optical elements was spread on a clean inverted pint paint can lid. Heptane was slowly introduced with a syringe or dropper at the edge of the lid until it overflows. The percentage of optical elements floating was estimated visually. In the absence of indicating otherwise, the beads were tested within 24 hours of being coated with the surface treatment.

2. Initial Adhesion—A polyurethane liquid binder having the following components was prepared:

| | |
|---|---|
| 27 parts | Rutile titanium dioxide pigment (commercially available from DuPont, New Johnsonville, TN under the trade designation "Tipure R-960") |
| 25 parts | polyester polyol (commercially available from Union Carbide Corp., Danbury, CT under the trade designation "Tone 0301") |
| 50 parts | aliphatic polyisocyanate (commercially available from Bayer Corp., Pittsburgh, PA under the trade designation "Desmodur N-100") |

The binder was drawn down on a paper liner at thickness of 30 mils. Immediately thereafter, a plurality of the indicated glass beads were sprinkled over the binder, maximizing the number of adhered beads per surface area of binder. The bead coated binder was then cured in an oven (100° C. for 30 minutes is typically sufficient for the polyurethane binder). The bead-coated binder film was examined under a microscope. The sample passes when the optical elements are embedded to about 40–80% of their diameters. Preferably the optical elements are embedded to about 40–70% of their diameters.

3. Accelerated Aging Adhesion—A ¼" (0.6 cm) by 1" (2.5 cm) piece of cured bead-coated binder film, prepared for the Initial Adhesion Test, is placed in a flask of boiling water for 24 hours. The aged sample is then inspected under a microscope to determine whether the optical elements remain embedded. The sample passes when the sample appears approximately the same as the initial sample and the beads are difficult to remove with a dissection probe.

4. Coefficient of Retroreflection (RA), in $cd/Lux/m^2$, was measured at an entrance angle of −4.0 degrees and an observation angle of 0.2° according to Procedure B of ASTM Standard E 809-94a. The photometer used for the measurements is described in U.S. Defensive Publication No. T987,003.

Optical Elements

The reflective glass beads employed to evaluate the effectiveness of the surface treatment of the invention had an index of refraction of 1.75 and an average diameter of 200 microns and were prepared according to the teaching of U.S. Pat. No. 4,564,556. Such beads are representative of optical elements commonly used for reflective paint (e.g. pavement markings).

For each of the examples the optical elements were surface treated by charging a 25 g sample of the beads into a round-bottom flask. A sufficient amount (8–10 ml) of the indicated solvent was added to cover and wet out the beads. The indicated fluorochemical (e.g. fluorinated (poly) urethane, fluorinated polyester, fluorinated polyphosphate) was then added as a dilute solution in an amount to provide the desired treatment level based on the weight of the reflective beads. The treated beads were dried in a forced air oven at 120° C. for 30 to 60 minutes. The dried beads were tested according to the Heptane Floatation Test, as previously described.

For Examples 1–7, the beads were treated with the indicated fluorochemical at a concentration of 500 ppm.

TABLE I

Percent Float of Beads Treated with Fluorinated Polyurethanes

| Example | Fluorochemical | Solvent | % Float |
|---|---|---|---|
| 1 | Fluorinated Polyurethane 1 | EtOAc | 100% |
| | | | 100%* |
| 2 | Fluorinated Polyurethane 2 | $H_2O$(Emulsion) | 100% |
| 3 | Fluorinated Polyurethane 3 | EtOAc | 100% |
| 4 | Fluorinated Polyurethane 4 | EtOH/NMP | 100% |
| 5 | Fluorinated Polyurethane 5 | $H_2O$(soluble) | 95% |
| 6 | Fluorinated Polyurethane 6 | EtOAc | 100% |
| 7 | Fluorinated Urethane 7 | EtOH | 34% |

**Coated with 250 ppm

All the fluorinated polyurethanes based on PBSF intermediates showed good performance for floating of glass beads, regardless of whether an organic solvent, aqueous emulsion or water-soluble solution was employed.

For Examples 8–13, the indicated fluorochemical was diluted with water to provide the indicated concentration.

TABLE II

Percent Float of Beads Treated with Fluorinated Polyurethanes

| Example | Fluorochemical | Concentration | % Float |
|---|---|---|---|
| 8 | Fluorinated Polyurethane 8 | 200 | ~100 |
| 9 | Fluorinated Polyurethane 9 | 250 | ~100 |
| | | 125 | ~90 |
| 10 | Fluorinated Polyurethane 10 | 250 | ~95 |
| | | 125 | ~90 |
| 11 | Fluorinated Polyurethane 11 | 250 | ~40 |
| 12 | Fluorinated Polyurethane 12 | 250 | ~95 |
| 13 | Fluorinated Polyurethane 13 | 150 | 100% |

It is surmised that the poor % Float results reported for Fluorinated Polyurethane 11 is due either to insufficient terminal fluorine or due to the rigidity of this particular polyurethane.

For Examples 14–17, the indicated fluorinated polyester was diluted with water and evaluated at a concentration of 200 ppm.

TABLE III

Percent Float of Beads Treated with Fluorinated Polyesters

| Example | Fluorochemical | % Float |
|---|---|---|
| 14 | Fluorinated Polyester 14 | 100% |
| 15 | Fluorinated Polyester 15 | 100% |
| 16 | Fluorinated Polyester 16 | 60% |
| 17 | Fluorinated Polyester 17 | 45% |

It is surmised that the poor % Float results reported for Fluorinated Polyester 16 and 17 is due to the rigidity of these particular polyesters. Alternatively, in the case of Fluorinated Polyester 17, the end group may be insufficiently polar.

For Examples 18–25, the indicated fluorinated polyphosphate was diluted with a 2 to 1 mixture of water and IPA and evaluated at a concentration of 200 ppm.

TABLE III

Percent Float of Beads Treated with Fluorinated Polyurethanes

| Example | Fluorochemical | % Float |
| --- | --- | --- |
| 18 | Fluorinated Polyphosphate 18 | 100% |
| 19 | Fluorinated Polyphosphate 19 | 100% |
| 20 | Fluorinated Polyphosphate 20 | 95% |
| 21 | Fluorinated Polyphosphate 21 | 100% |
| 22 | Fluorinated Polyphosphate 22 | 100% |
| 23 | Fluorinated Polyphosphate 23 | 100%* |
| 24 | Fluorinated Polyphosphate 24 | 100% |
| 25 | Fluorinated Polyphosphate 25 | 100% |

*250 ppm

Adhesion testing was conducted on some of the surface treated glass beads. The glass beads were pretreated with 600 ppm of 3-aminopropyltriethoxysilane commercially available from OSI Specialties, Danbury, Conn. under the trade designation "Silquest A-1100". The beads were coated with the surface treatment indicated in column 1 at the treatment level indicated in column 2 in the manner previously described. Table IV depicts the % Float, Initial Adhesion, Accelerated Aging Adhesion, and the Coefficient of Retroreflection (RA).

TABLE IV

| Surface Treatment | Loading (ppm) | % Float | Initial Adhesion (%) | Accelerated Aging (pass/fail) | RA (cd/lux/m$^2$) |
| --- | --- | --- | --- | --- | --- |
| Control* (none) | 0 | 0 | ~95 | ** | 0.4 |
| Control (none) | 0 | 0 | ~95 | ** | 0.5 |
| Fluorinated Polyurethane 8 | 75 | 95–100 | ~75 | Pass | 2.5 |
| Fluorinated Polyurethane 8 | 100 | 95–100 | ~75 | Pass | 2.0 |
| Fluorinated Polyurethane 8 | 123 | 95–100 | ~75 | Pass | 2.5 |
| Fluorinated Polyphosphate 24 | 75 | 95 | ~40 | | 6.7 |
| Fluorinated Polyphosphate 24 | 100 | 100 | ~40 | | 6.8 |
| Fluorinated Polyphosphate 24 | 150 | 95 | ~40 | | 6.9 |
| Fluorinated Polyester 14 | 150 | 50 | | | |
| Fluorinated Polyester 14 | 300 | 95 | ~50 | | 6.5 |

*no "Silquest A-1100"
**Could not be determined since the beads were embedded to 95%

What is claimed is:

1. Optical elements having a fluorochemical surface treatment wherein the fluorochemical comprises the reaction product of
   a) at least one hydroxyl group containing non-fluorinated polyol;
   b) at least one hydroxyl group containing fluorinated monoalcohol; and
   c) a coreactant selected from
      i) polyisocyanates,
      ii) polycarboxylic acids and derivatives thereof, or
      iii) (poly)phosphoric acid derivatives.

2. The optical elements of claim 1 wherein at least one reactant or coreactant comprises a water-solubilizing group or a silane.

3. The optical elements of claim 1 wherein the percent float in heptane is at least about 90%.

4. The optical elements of claim 1 wherein the fluorinated group is selected from perfluoroalkyl and perfluoroheteroalkyl.

5. The optical elements of claim 4 wherein the perfluoroalkyl group comprises no more than 6 carbon atoms.

6. The optical elements of claim 4 wherein the perfluoroalkyl group comprises no more than 4 carbon atoms.

7. The optical elements of claim 4 wherein the perfluoroalkyl group has at least two 2 carbon atoms.

8. The optical elements of claim 1 wherein the hydroxyl group containing material is a fluorinated monoalcohol.

9. The optical elements of claim 1 wherein the hydroxyl group containing material is a fluorinated polyol.

10. The optical elements of claim 1 wherein the hydroxyl group containing material is substituted with a water-solubilizing group.

11. The optical elements of claim 1 wherein the coreactant is substituted with a water-solubilizing group.

12. The optical elements of claim 1 wherein at least one coreactant comprises a fluorinated group.

13. Optical elements having a fluorochemical surface treatment wherein the fluorochemical comprises the reaction product of
   a) at least one hydroxyl group containing material reactant substituted with a silane group; and
   b) a coreactant selected from
      i) polyisocyanates,
      ii) polycarboxylic acids and derivatives thereof, or
      iii) (poly)phosphoric acid derivatives;
   wherein at least one reactant or coreactant comprises a fluorinated group.

14. Optical elements having a fluorochemical surface treatment wherein the fluorochemical comprises the reaction product of
   a) at least one hydroxyl group containing material reactant; and
   b) a coreactant substituted with at a silane group selected from
      i) polyisocyanates,
      ii) polycarboxylic acids and derivatives thereof, or
      iii) (poly)phosphoric acid derivatives;
   wherein at least one reactant or coreactant comprises a fluorinated group.

15. Optical elements having a fluorochemical surface treatment wherein the fluorochemical comprises the reaction product of
   a) at least one hydroxyl group containing material reactant; and
   b) a coreactant selected from
      i) polyisocyanates,
      ii) polycarboxylic acids and derivatives thereof, or
      iii) (poly)phosphoric acid derivatives;
   wherein at least one reactant or coreactant comprises a fluorinated group and the reaction product further comprises a long chain hydrocarbon monalcohol, a monofunctional fluorochemical, a water-solubilizing groups containing ingredient, silane group containing ingredient or mixture thereof.

16. Optical elements having a fluorochemical surface treatment wherein the fluorochemical comprises the reaction product of
   a) at least one hydroxyl group containing material reactant; and
   b) a polyisocyanate, wherein at least one reactant or coreactant comprises a fluorinated group and the reaction product further comprises a silane group.

* * * * *

UNITED STATES PATENT AND TRADEMARK OFFICE
CERTIFICATE OF CORRECTION

PATENT NO. : 6,582,759 B1
DATED : June 24, 2003
INVENTOR(S) : Qiu, Zai-Ming

It is certified that error appears in the above-identified patent and that said Letters Patent is hereby corrected as shown below:

Column 4,
Lines 24-25, insert -- be -- between "can" and "subsequently".

Column 5,
Line 14, indent the sentence starting with "Fluorocarbon monoalcohol" as a separate paragraph.
Line 19, insert -- ) -- following "($C_2F_4O_3$".

Column 6,
Line 2, insert -- . -- following "like".
Line 39, insert -- . -- following "coreactant".
Line 60, insert a space between "d" and "s" in "preferredsurface".
Line 62, the formula ending in "$OR^1$" is overlapped with the title "(Formula I)", please separate the formula from the title with spaces.

Column 9,
Line 57, "M," should be -- Mn -- preceding "in the range of".

Column 12,
Line 52, insert -- . -- following "phosphate".

Column 15,
Line 58, delete "such as described in" after "techniques".

Column 21,
Line 53, "hours" following "1" should read -- hour --.

Column 22,
Line 59, "hour" should read -- hours --.

UNITED STATES PATENT AND TRADEMARK OFFICE
CERTIFICATE OF CORRECTION

PATENT NO. : 6,582,759 B1
DATED : June 24, 2003
INVENTOR(S) : Qiu, Zai-Ming

It is certified that error appears in the above-identified patent and that said Letters Patent is hereby corrected as shown below:

<u>Column 26,</u>
Line 23, Table I, Example 7, in the "% float" column "34%" should be -- 84% --.

Signed and Sealed this

Twenty-fifth Day of November, 2003

JAMES E. ROGAN
*Director of the United States Patent and Trademark Office*